United States Patent
Cueman

(10) Patent No.: US 11,338,234 B2
(45) Date of Patent: May 24, 2022

(54) AIR FILTRATION MEDIA WITH PERFORMING ENHANCING ADDITIVES

(71) Applicant: PPA Industries, Inc., Hickory, NC (US)

(72) Inventor: Glenn F. Cueman, Denver, NC (US)

(73) Assignee: PPA Industries, Inc., Hickory, NC (US)

( * ) Notice: Subject to any disclaimer, the term of this patent is extended or adjusted under 35 U.S.C. 154(b) by 196 days.

(21) Appl. No.: 16/751,329

(22) Filed: Jan. 24, 2020

(65) Prior Publication Data

US 2020/0155989 A1    May 21, 2020

Related U.S. Application Data

(63) Continuation-in-part of application No. 15/630,352, filed on Jun. 22, 2017, now Pat. No. 10,543,447.

(60) Provisional application No. 62/353,070, filed on Jun. 22, 2016.

(51) Int. Cl.
*B01D 53/02* (2006.01)
*B01D 46/00* (2022.01)
*B01D 46/52* (2006.01)

(52) U.S. Cl.
CPC ...... *B01D 46/0005* (2013.01); *B01D 46/0028* (2013.01); *B01D 46/0038* (2013.01); *B01D 46/522* (2013.01); *B01D 2201/12* (2013.01); *B01D 2201/30* (2013.01); *B01D 2279/65* (2013.01)

(58) Field of Classification Search
CPC ............ B01D 2279/65; B01D 46/0001; B01D 46/0005; B01D 46/0028; B01D 46/0038; B01D 46/521
See application file for complete search history.

(56) References Cited

U.S. PATENT DOCUMENTS

| | | |
|---|---|---|
| 4,411,948 A | 10/1983 | Ogino et al. |
| 5,338,340 A | 8/1994 | Kasmark, Jr. et al. |
| 5,350,443 A | 9/1994 | von Blucher et al. |
| 6,099,901 A | 8/2000 | Crania et al. |
| 2002/0152890 A1 | 10/2002 | Leiser |
| 2006/0272508 A1 | 12/2006 | Hoke et al. |

*Primary Examiner* — Christopher P Jones
(74) *Attorney, Agent, or Firm* — Nexsen Pruet, PLLC; Seth Hudson

(57) ABSTRACT

An air filter that includes a filtration material having at least one surface, an enclosed frame surrounding said filter material but exposing said one surface, said filter material having intermittent geometric shapes of latex on said at least one surface, said latex containing an enhanced additive.

17 Claims, 4 Drawing Sheets

AIR FILTRATION MEDIA WITH PERFORMING ENHANCING ADDITIVES

CROSS REFERENCE TO RELATED PATENT APPLICATION

This continuation-in-part patent application claims priority to U.S. patent Ser. No. 15/630,352 filed Jun. 22, 2018 and entitled "AIR FILTRATION MEDIA WITH PERFORMING ENHANCING ADDITIVES AND METHOD FOR APPLICATION THEREOF", which claims priority to U.S. Provisional Patent Ser. No. 62/353,070 filed Jun. 22, 2016 and entitled "METHOD FOR APPLICATION OF PERFORMING ENHANCING ADDITIVES ONTO AIR FILTRATION MEDIA," the contents of which are incorporated by reference herein.

FIELD OF THE INVENTION

The present invention relates generally to the addition of performing enhancing additives to an air filtration media, and more generally relates to the addition of intermittent geometric shapes of latex on the surface of an air filtration media that contain an enhanced additive.

BACKGROUND OF THE INVENTION

It is known to apply to non woven media dots of various shapes, as well as lines and other geometric shapes. Such geometric shapes were being printed in a variety of thicknesses. The purpose of the printing application was to thicken or stiffen the material for use as a garment interlining. In other applications, dots and other shapes have been printed onto non woven, knitted and woven fabrics for the purpose of creating an abrasive or high friction surface for cleaning or gripping (hospital socks having gripping media). Importantly, the dots, shapes, or lines are typically spaced apart, allowing significant spaces between them. The materials from which the dots, shapes or lines were made included a variety of polymeric materials, often resulting from liquid emulsions of fine powders, pigments, and binders which are subsequently cured and/or polymerized on the surface of the fabric through the application of heat. Some versions can be cured through other means, including the addition of catalysts, UV, or other means.

Air filtration filters have become increasingly able to trap very fine particulates, including particles as small as sub micron in size. However, new problems have arisen that potentially affect the performance of the filter. As an example, filters using current technology can actually trap particles as small as bacteria, fungus, and mold spore. Air filters in residential and commercial applications often exist in dark, warm, moist spaces, which is an ideal environment for microbiological growth. This microbial growth in and on the air filter can cause odors which are distributed throughout the residence or business. It also actually shortens the life of the filter, with microbiological growth actually restricting airflow, leading to premature replacement. Additives may be incorporated into and onto air filtration media through several methods. One method includes mixing them into the binder of the fibers (on binder based non wovens). The problems with this method include the potential for the binder to encapsulate the additives, rendering them ineffective.

Additionally, the inclusion of the additives can adversely impact the curing of the binder resulting in poor fabric structure and filtration performance. Another method for producing non woven fabrics is the use of bicomponent fibers which have a layer of lower melt temperature polymer allowing the fibers to bond together with the application of temperature and form the non woven fabric. In this method of fabric construction, the additives must be incorporated directly into the fiber when it is extruded. The additives can be encapsulated and rendered ineffective, or the additives can actually interfere with the extrusion process, slowing production or affecting fiber quality. Similar issues result with meltblown or meltspun non woven fabrics, where the additives are incorporated directly into the fibers as they are formed. In another method of treating fabrics with additives, silane based coatings containing the additives are applied directly onto the fabrics. Several issues are associated with this method. First, the silane coatings are applied to the entire surface of the fabric, typically wetting the entire fabric, and then are cured in place. This can affect the filtration performance characteristics of the fabric, often increasing the resistance to airflow and interfering with electrostatic treatments. Additionally, this type of coating is often not compatible with porous particulate additives, effectively plugging the pores.

The present invention solves all the potential problems set forth above by using a method of printing dots, shapes or lines or other intermittent geometric shapes onto filtration media, leaving significant spacing between the printed dots, shapes, or lines. Airflow is very minimally affected versus coating the entire fabric. Additionally, the thickness of the dots, shapes, or lines can be closely controlled, allowing thicker or thinner application as required for different types of additives. The intermittent geometric shapes are applied in an aqueous latex base and then cured on the filtration media by heating, chemical reaction, U.V. curing or other known methods. The intermittent geometric shapes can be applied to the filtration media by a printing process.

BRIEF SUMMARY OF THE INVENTION

According to an embodiment of the present invention, an air filter includes a filtration material having at least one surface, an enclosed frame surrounding said filter material but exposing said one surface. The filter material has intermittent geometric shapes of latex base on said at least one surface with said latex base containing an enhanced additive.

According to another embodiment of the present invention, the air filter includes an enhanced additive that is at least one antimicrobial additive.

According to yet another embodiment of the present invention, the air filter includes an enhanced additive that is at least one odor control additive.

According to yet another embodiment of the present invention, the air filter contains an enhanced additive that is at least one antimicrobial additive and at least one odor control additive.

According to yet another embodiment of the present invention, the air filter contains zinc pyrithione or silver based compounds as the antimicrobial additive.

According to yet another embodiment of the present invention, the air filter contains carbon, natural or synthetic zeolites, molecular sieves, silica gel, and/or baking soda as the odor control additives.

According to yet another embodiment of the present invention, the air filter contains a latex base in the shape of a circular dot.

According to yet another embodiment of the present invention, the air filter contains a latex base in the shape of a square.

According to yet another embodiment of the present invention, the air filter contains a filtration material that is folded in accordion fashion to form a plurality of v-shaped pleats and housed within a paper-board frame, said filter material having a plurality of intermittent geometric shapes of a latex base on at least the first side or second side of the filtration material, said latex based containing a latex binder and an enhanced additive.

According to yet another embodiment of the present invention, the method of making an air filter that includes producing air filtration media, printing a latex base contains antimicrobial additives and/or odor control additives on said air filtration media.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
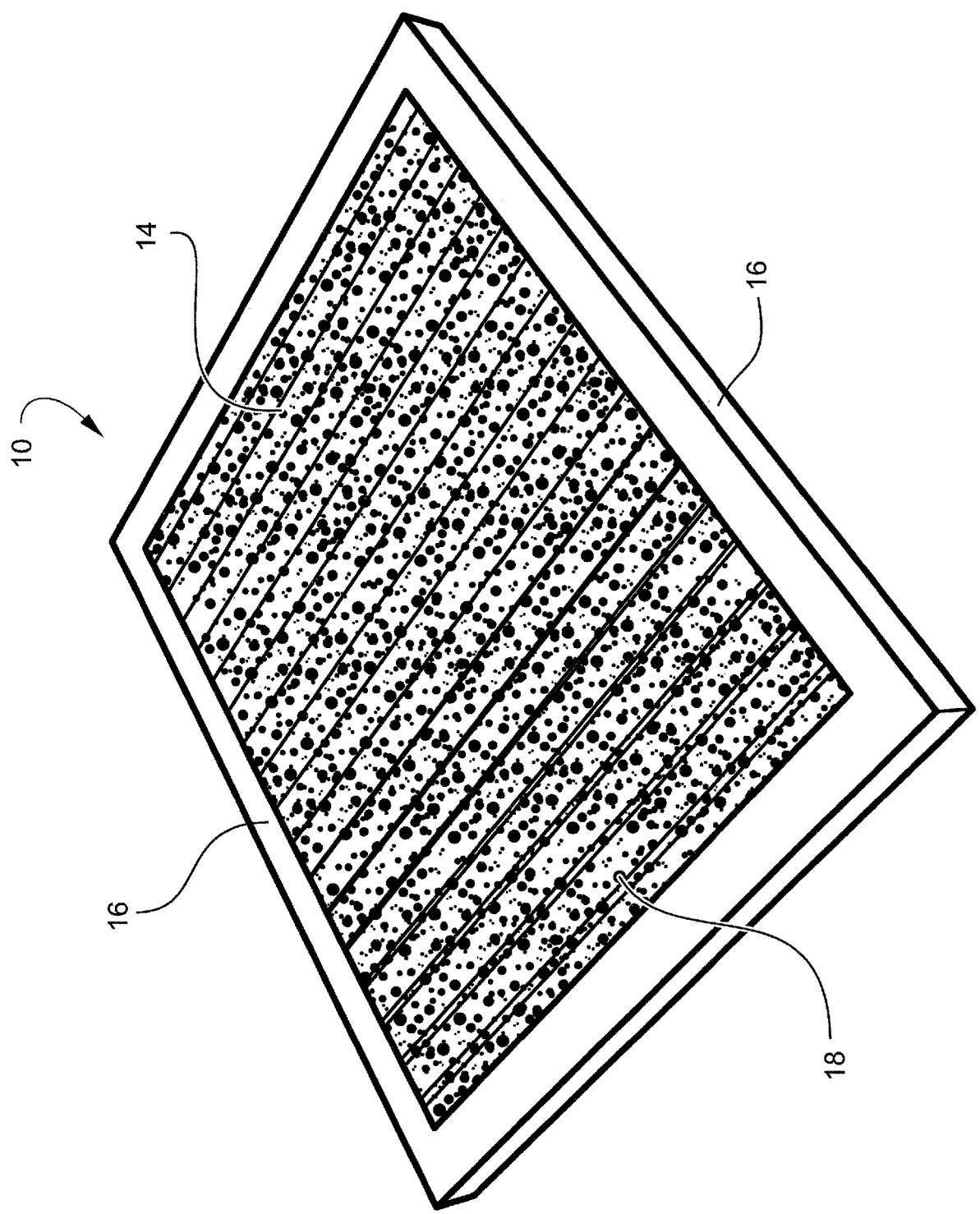
FIG. 1 is a top perspective view of an air filtration media for use with the present invention.
Figure 2:
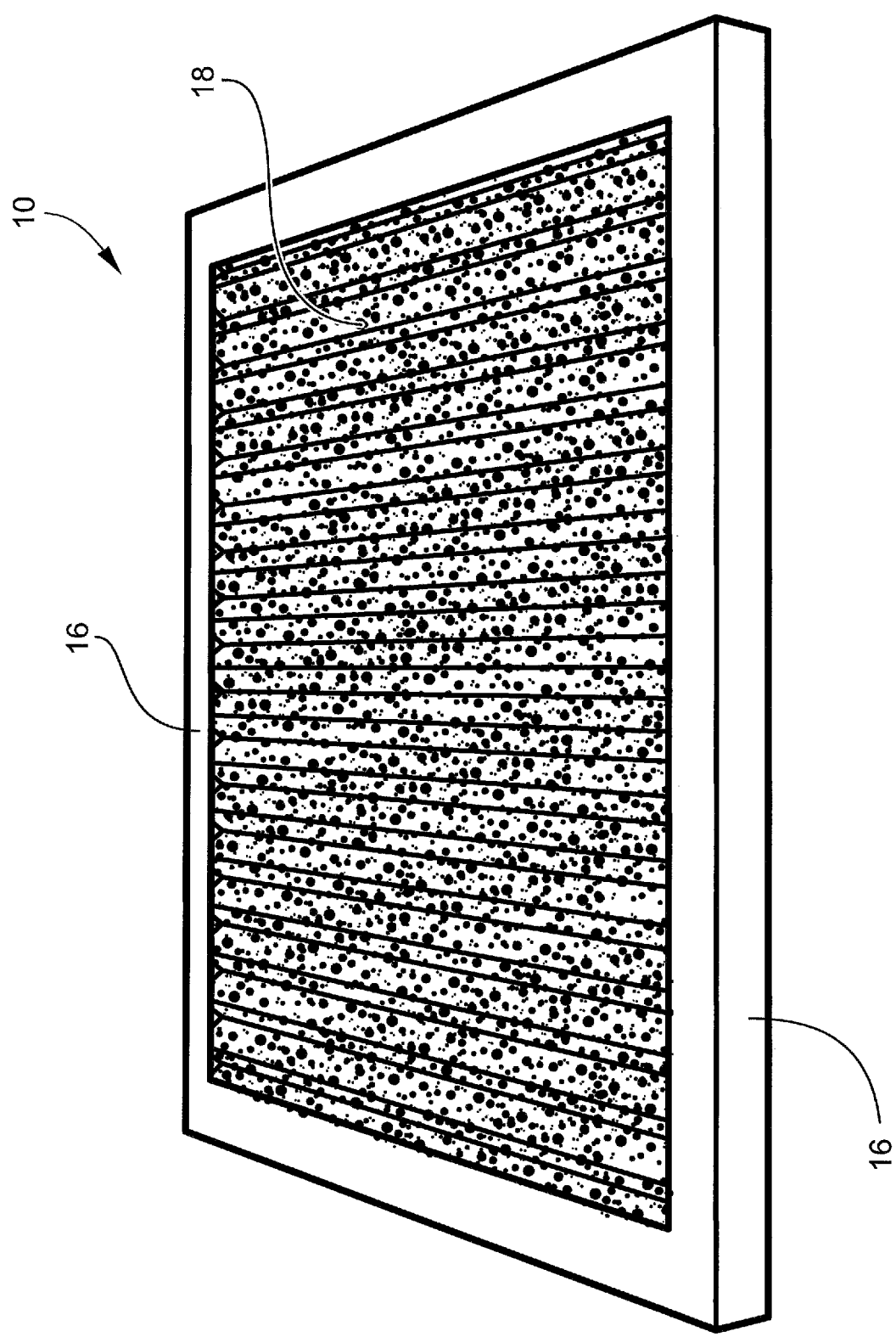
FIG. 2 is a side perspective view of an air filtration media for use with the present invention.

Referring now specifically to the drawings, an exemplary air filter is illustrated in FIG. 1 and is shown generally at reference numeral 10. The air filter 10 comprises a filtration media 14 having a first side and a second side that is composed of a non-woven web for blocking particulate matter carried by the air through common HVAC ductwork or air within livable space. The filtration media 14 is folded in accordion fashion to form a plurality of V-shaped pleats, and is housed in a rectangular, paper-board frame 16.

The filtration media 14 contains a plurality of deposits of an aqueous latex base 18. The deposits of the latex base 18 may be in the form of intermittent geometric shapes that are then cured on the surface of the filtration media 14 by heating, chemical reaction, U.V. curing or other known methods. The deposits of an aqueous latex base 18 can be applied to the filtration media 14 by a printing process. The deposits of the aqueous latex base 18 may have any number of shapes, but a generally circular dot is illustrated in the figures. In other alternative embodiments, the geometric shapes may be squares, lines, triangles, company logos, words, figures, and the like.

Figure 3:
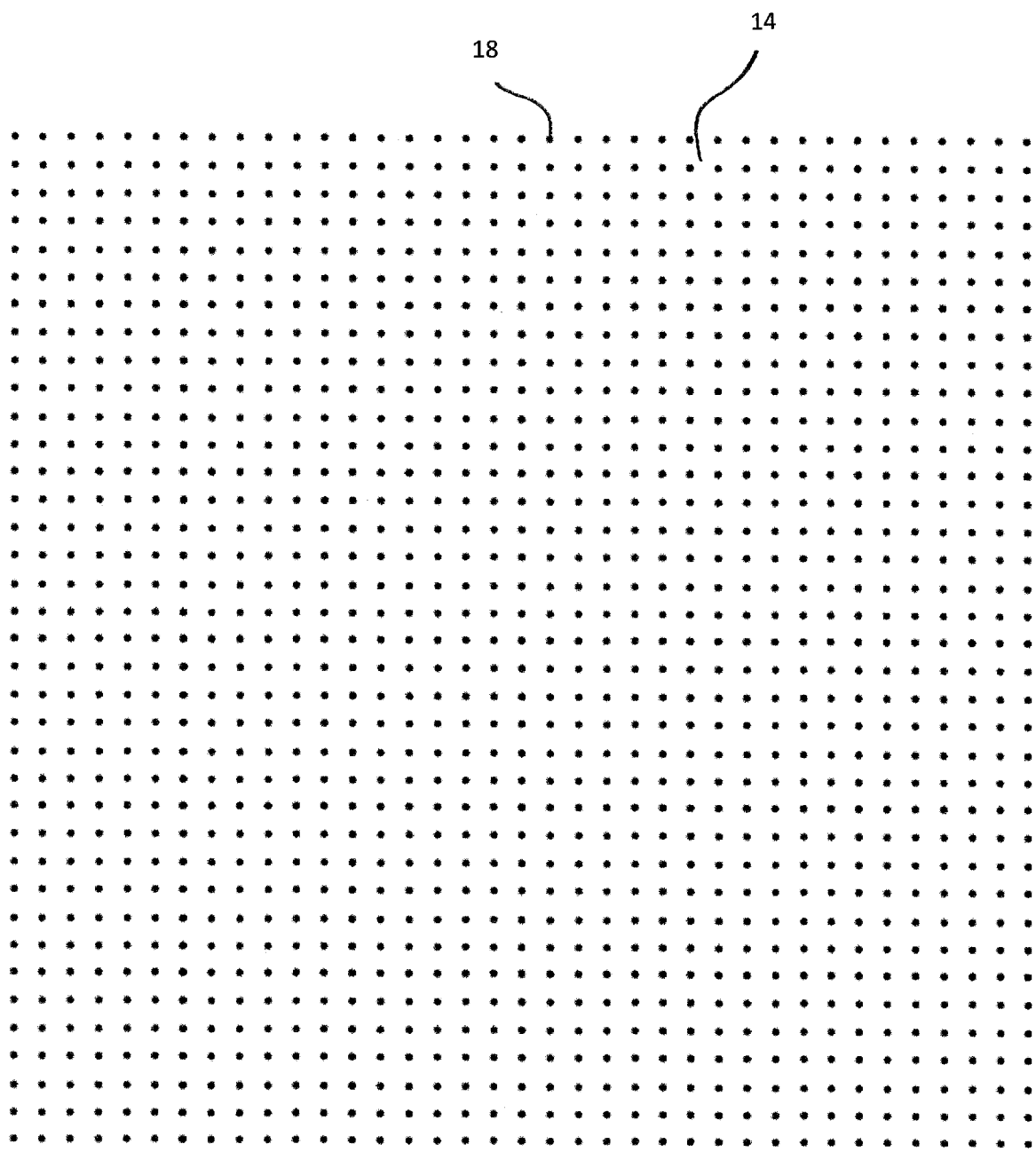
FIG. 3 illustrates an embodiment of the position of the latex base in the form of circular dots on a surface of a filtration media, wherein the circular dots are 1 mm in diameter and the surface of the filtration media contains 49 dots per square inch.
Figure 4:
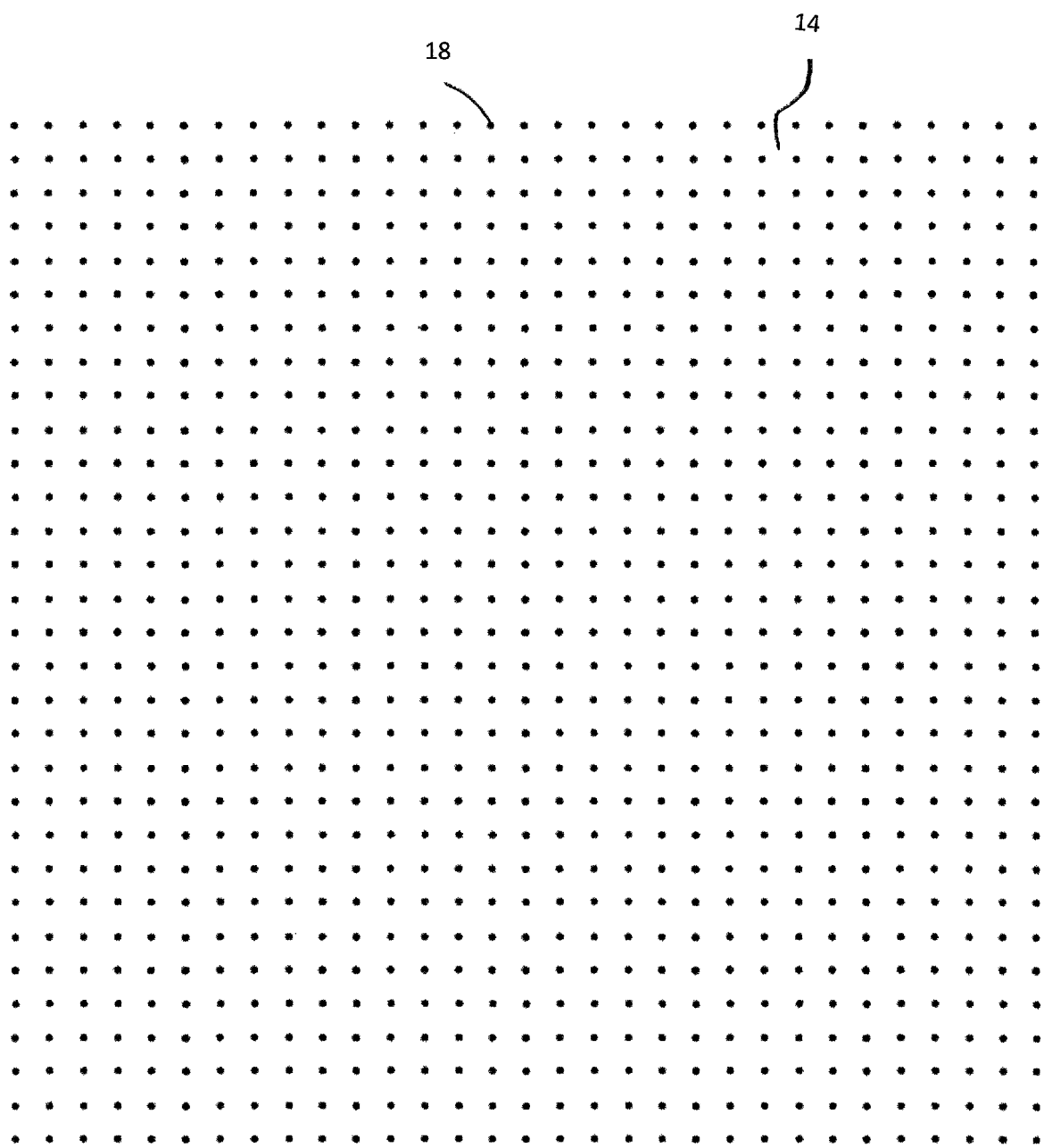
FIG. 4 illustrates an embodiment of the position of the latex base in the form of circular dots on a surface of a filtration media, wherein the circular dots are 1 mm in diameter and the surface of the filtration media contains 36 dots per square inch.

When the geometric shape of the latex base 18 is a circular dot, the dots preferably have a diameter of between about 0.1 mm to about 2 mm. The amount of dots and the spacing of the dots is equivalent to between about 30 per square inch to about 70 per square inch along a surface of the air filtration media 14. The dots are preferably spaced an equal distance apart as shown in FIG. 3. FIG. 3 also illustrates an embodiment of the position of the latex base 18 in the form of circular dots on a surface of a filtration media 14, wherein the circular dots are 1 mm in diameter and the surface of the filtration media 14 contains 49 dots per square inch. FIG. 4 illustrates an embodiment of the position of the latex base 18 in the form of circular dots on a surface of a filtration media 14, wherein the circular dots are 1 mm in diameter and the surface of the filtration media 14 contains 36 dots per square inch.

The latex base 18 contains at least one enhanced additive that is incorporated into the latex base 18. The latex base 18 is composed of a latex binder and at least one enhanced additive. Such enhanced additives may include antimicrobial additives and odor control additives. Antimicrobial additives may include zinc pyrithione and silver based compounds that, can be readily incorporated into the latex base 18 for depositing on a filtration media 14. Odor control additives such as carbon, natural and synthetic zeolites, molecular sieves, silica gels and baking soda may also be incorporated into the latex base 18 for depositing on a filtration media 14. Additionally, the latex base 18, in addition to the latex binder and enhanced additive, may contain a pigment or color additive to make the latex base 18 visible. By way of example, the latex base 18 may have blue pigment that allows it to be easily seen on the filtration media 14. The pigment or color additive may also designate the actual additive within the latex base 18. For example, a green colored latex base 18 may indicate an antimicrobial additive is present, while a red colored latex base 18 may indicate an antimicrobial additive and odor additive are present. The colors used herein are examples, and any color or color combination may be utilized for these intended purposes.

The latex base 18 may be composed of up to 10% of an antimicrobial additive, up to 10% of an odor control additive, up to 90% latex binder, and optionally, up to 5% of a pigment, wherein the total weight of the latex base is 100%.

More preferably, the latex base 18 may be composed of between about 5% to about 10% of an antimicrobial additive, between about 5% to about 10% of an odor control additive, up to about 90% latex binder, and optionally up to 5% of a pigment, wherein the total weight of the latex base is 100%. The ideal pressure drop of the air filter containing the latex base with enhanced additives is between about 0.15" to about 0.40", and more preferably between about 0.23" to about 0.28" with an air flow rate of between about 600 cfm to about 900 cfm, and preferably an air flow rate of between about 800 cfm and about 850 cfm.

EXAMPLES

Example 1

Non woven fabrics were selected that were already widely used in air filtration applications. While still in full width form, in this case 105 inches, they were prepared to undergo a printing process using water based latex polymer emulsion. The emulsion to be applied to the fabric was prepared, and it included an antimicrobial compound, zinc pyrithione, in a percentage which would result in an amount added to the non woven fabric construction of 0.015 wt. %, based on the total weight of the fabric. The fabric was printed with dot shapes approximately 1 mm in diameter, and the dot shapes were approximately 4 mm apart from one another. After curing, the fabric was slit to an appropriate width to fabricate an air filter (19.75"). The fabric was then pleated and incorporated into a paperboard frame. Tests were performed on the media to compare resistance to airflow, also described as delta P, or back pressure. The results were compared to the same conventional media which was not printed or modified in any way with additives. The airflow was compared and found to be essentially identical. However, the particle removal efficiency was better with the enhanced additive (antimicrobial compound) of the present invention. It is speculated that the improved efficiency was due to the antimicrobial additive that prevented the proliferation of bacteria, mold, mildew, fungus etc., on the filter surface. In this way the filter removed more particles rather than become clogged with the bacteria, etc.

The test conditions included 300 CFM air flow, temperature of 76° F., 45% relative humidity, 29.03 in HG barometric pressure, and 110 FPM media velocity. A Met One 3413 particle counter was utilized.

Table 1 and 2 below illustrate test data for air filtration media of the present invention. Table 3 and 4 below illustrate test data for filtration media without an enhanced additive.

TABLE 1

Media Resistance to Air Flow

| Air FlowCFM | Air FlowVelocity-FPM | Resistance- in. wg |
|---|---|---|
| 125 | 45 | 0.05 |
| 250 | 90 | 0.10 |
| 375 | 135 | 0.16 |
| 500 | 180 | 0.23 |
| 625 | 225 | 0.30 |

TABLE 2

KCl Particle Removal Efficiency by Particle Size (Per ASHRAE 52.2 Test Standard)

| 0.30 to 1 Microns | | 1.0 to 3.0 Mircons | | 3.0 to 10.0 Microngs | |
|---|---|---|---|---|---|
| Mean Size | Efficiency % | Mean Size | Efficiency % | Mean Size | Efficiency % |
| 0.35 | 11.35 | 1.14 | 54.47 | 3.46 | 89.02 |
| 0.47 | 20.10 | 1.44 | 64.00 | 4.69 | 91.24 |
| 0.62 | 31.23 | 1.88 | 74.61 | 6.2 | 92.12 |
| 0.87 | 42.17 | 2.57 | 84.72 | 8.37 | 93.02 |
| Average Efficiency | 26.21 | Average Efficiency | 69.45 | Average Efficiency | 91.35 |

TABLE 3

Media Resistance to Air Flow

| Air FlowCFM | Air FlowVelocity-FPM | Resistance - In. wg |
|---|---|---|
| 125 | 45 | 0.05 |
| 250 | 90 | 0.10 |
| 375 | 135 | 0.15 |
| 500 | 180 | 0.22 |
| 625 | 225 | 0.28 |

TABLE 4

KCl Particle Removal Efficiency by Particle Size (Per ASHRAE 52.2 Test Standard)

| 0.30 to 1 Microns | | 1.0 to 3.0 Mircons | | 3.0 to 10.0 Microngs | |
|---|---|---|---|---|---|
| Mean Size | Efficiency % | Mean Size | Efficiency % | Mean Size | Efficiency % |
| 0.35 | 0.00 | 1.14 | 25.57 | 3.46 | 79.55 |
| 0.47 | 1.56 | 1.44 | 36.04 | 4.69 | 85.51 |
| 0.62 | 7.40 | 1.88 | 51.15 | 6.2 | 88.87 |
| 0.87 | 14.71 | 2.57 | 70.51 | 8.37 | 90.52 |
| Average Efficiency | 5.92 | Average Efficiency | 45.82 | Average Efficiency | 86.11 |

Example 2

A test of antimicrobial efficacy was performed. The printed fabric was tested using the Kirby-Bauer Susceptibility Test, Zone of Inhibition and found to have excellent antimicrobial performance against gram positive and gram negative bacteria. The sample size of the filtration media is 20 mm×20 mm with a Soybean Casein Digest Broth culture medium with a sterile saline inoculum carrier. The growth medium is Mueller-Hinton Agar. The test results are shown in Table 5:

TABLE 5

| Sample ID | Organism | Zone of Inhibition |
|---|---|---|
| 1 | Klebsiella pheumoniae ATCC 4352 | Inhibition of growth under sample and clear zone of inhibition surrounding the sample and zone width (11 mm) |

TABLE 5-continued

| Sample ID | Organism | Zone of Inhibition |
|---|---|---|
| | Staphylococcus aureus ATCC 6538 | Inhibition of growth under sample and clear zone of inhibition surrounding the sample and zone width (10 mm) |

In this test, the sample size was made to fit a Petri dish and the dots remained the same size (about 1 mm in diameter). As can be seen the zone of inhibition (that area beyond the area of the dot that remained organism free) was significantly greater than the dot size. Since the dots are spaced about 4 mm apart, and the zone of inhibition for each dot was even greater, the entire sample showed no signs of microorganism growth. Untreated samples had extensive bacterial growth on the surface of the fabric, while the fabric with the printed dots did not.

Example 3

In this example, a standard testing procedure was used for evaluating the effectiveness of various odor reduction media to remove volatile organic compounds (VOCs) in a specified environment. The testing procedure involves placing a known sample size of media (defined by its mass, surface area, etc.) in a sealed chamber equipped with a cross polytetrafluoroethylene (PTFE) stirring system that will slightly move air around the sample within the sealed chamber. The chamber is also configured with sample injection and removal ports which allow a known VOC concentration to be injected into the chamber and slightly moved around the sample. The VOC concentration will be monitored over time to determine the effectiveness of the sample to lower the concentration. At set time intervals, a small sample of the VOC atmosphere in the sealed chamber will be removed by a small syringe and analyzed by a Gas Chromatograph equipped with a Flame ionization Detection device. The effectiveness of the sample method can be determined by the amount of VOC reduced with respect to time. Toluene is the standard testing material for VOC removal primarily because it is a relatively small molecule.

Sample 1—This procedure involved making a known gas standard of the contaminant in air and moving gas standard over a known weight of filter material from the sample material. The gas standard was measured prior to exposing it to the filter material and after exposing it to the filter material. The amount absorbed by the media was determined. The filter media samples were evaluated using Toluene as the contaminant. It was determined that toluene reduction was 43.43%.

Example 4

Like Example 3, this procedure of Example 4 involved a sample containing intermittent geometric shapes, specifically in the shape of circular dots, composed of a latex binder and Oguard and baking soda as the enhanced additives on the surface of a Merv 11 rated filter media. The test involved making a known gas standard of the contaminant in air and moving gas standard over a known weight of filter material from the sample material. The gas standard was measured prior to exposing it to the filter material and after exposing it to the filter material. The amount absorbed by the media was determined. The filter media samples were evaluated using Toluene as the contaminant. The sample was also analyzed for the amount of Sodium Bicarbonate. The result is found below:

TABLE 6

| Sample | Enhanced Additives | Toluene Reduction | Sodium Bicarbonate |
|---|---|---|---|
| 2 | Oguard and Baking Soda | 39.64% | 0.25% |

Example 5

Like Example 4, this test involved making a known gas standard of the contaminant in air and moving gas standard over a known weight of filter material from the sample material. The gas standard was measured prior to exposing it to the filter material and after exposing it to the filter material. The amount absorbed by the media was determined. The filter media samples were evaluated using Toluene as the contaminant. Sample 3 was also analyzed for the amount of Sodium Bicarbonate. Sample 3 contained a filter media with intermittent geometric shapes, specifically in the shape of circular dots, composed of a latex binder and an antimicrobial, Oguard, and baking soda as the enhanced additives on the surface of a Merv 8 rated air filter. Sample 4 contained a filter media with a Merv 11 rating with intermittent geometric shapes, specifically in the shape of circular dots, composed of a latex binder containing carbon. The results are found below:

TABLE 7

| Sample | Merv Rating | Toluene Reduction | Sodium Bicarbonate |
|---|---|---|---|
| 3 | 8 | 20.98% | 0.77% |
| 4 | 11 | 43.43% | nm |

Example 6

An air filter with a Merv 12 rating was tested according to ASHRAE test standard 52.2-2012. The dimensions of the filter was 20"×20"×1" with 30 pleats. The surface of the non-woven filter media contained intermittent geometric shapes, specifically in the shape of circular dots, composed of a latex binder and a zinc based antimicrobial and Oguard. The test results are found below in Table 8.

TABLE 8

| | |
|---|---|
| Test Air Flow Rate (CFM)/Velocity (FPM) | 819 cfm/295 fpm |
| Initial Resistance (in. WG) (pressure drop) | 0.276" |
| Final Resistance (in. WG) | 1.000" |
| Minimum Efficiency Rating Value (MERV) | Merv 12 @ 819 cfm |
| Minimum Average Efficiency 0.3 to 1.0 Microns (E1) | 37.0 |
| Minimum Average Efficiency 1.0 to 3.0 Microns (E2) | 82.6 |
| Minimum Average Efficiency 3.0 to 10 Microns (E3) | 96.4 |
| Dust Fed to Final Resistance (grams) | 48.1 grams |
| Dust Holding Capacity (grams) | 45.3 grams |
| Arrestance | 94.2% |
| LMS Dust Holding Capacity @0.5" | 17.3 gramps |
| FPR | 12 |

Comparative Data

Set forth below are various enhanced additives that are incorporated into a synthetic filter media. The first sample has no enhanced additive. The second sample has Oguard (a VOC reduction material) and Microban, an antimicrobial additive. The third sample is a layer or coating of Oguard and carbon. The fourth sample is a thick mat of carbon. These 4 samples were tested for VOC removal or reduction. As can be seen, only the thick carbon mat removed more VOC than the 43.43% toluene removal of the present invention. The thick carbon mat, however had a severe reduction in air flow efficiency unsuitable for air filters.

Four (4) different filter media samples were exposed to low levels of toluene in a static condition to determine the levels of toluene absorbed by the different media. The procedure involved placing 0.5000 grams of the media in a 50 ml sealed vessel containing 217 nanograms of toluene and exposing the media to the toluene for six (6) hours, the amount of toluene absorbed by the media was determined. The media tested: Sample 5—KC Media—No Oguard—No Microban; Sample 6—Media KC with Oguard Additive and Microban; Sample 7—Oguard and Microban; and Sample 8—Thick Mat (carbon). The results are shown below:

| Sample | % Toluene Reduction |
| --- | --- |
| 5 | 12.96% |
| 6 | 27.25% |
| 7 | 33.13% |
| 8 | 49.10% |

When compared to untreated media, as shown in Sample 5, there was a large differential in VOC reduction capacity, stated in a percentage reduction over specific time units. This validated the performance when compared to untreated media.

A test of antimicrobial efficacy was performed on conventional filter media. The filter media was tested using the AATCC Test Method 147, Zone of Inhibition. The sample size of the filtration media is 25 mm×50 mm with a Nutrient Broth culture medium with a sterile water inoculum carrier. The growth medium is a Nutrient Agar. The test results are shown in Table 9:

TABLE 9

| Sample ID | Organism | Zone of Inhibition |
| --- | --- | --- |
| 9 | Klebsiella pneumoniae ATCC 4352 | Inhibition of growth under sample and clear zone of inhibition surrounding the sample and zone width (7 mm) |
|  | Staphylococcus aureus ATCC 6538 | Inhibition of growth under sample and clear zone of inhibition surrounding the sample and zone width (8 mm) |

In this test, the sample size was made to fit a Petri dish and the dots remained the same size (about 1 mm in diameter). As can be seen the zone of inhibition (that area beyond the area of the dot that remained organism free) was significantly less than the zone of inhibition of the present invention as shown in Example 2 above.

An air filter with a Merv 12 rating was tested according to ASHRAE test standard 52.2-2012. The dimensions of the filter was 20"×20"×1" with 27 or 18 pleats. The surface of the non-woven filter media contained intermittent geometric shapes, specifically in the shape of dots, printed directly on the non-woven filter media and composed of a latex binder and a zinc based antimicrobial and Oguard. The spacing of the dots was 120 per square inch. The test results are found below in Table 10.

TABLE 10

| Flow Rate (cfm) | DP "$H_2O$ |
| --- | --- |
| 164 | 0.073 |
| 328 | 0.154 |
| 492 | 0.257 |
| 656 | 0.374 |
| 819 | 0.509 |

The pressure drop of 0.374 and 0.509 was too high with the dot spacing of 120 per square inch at 656 cfm and 819 cfm, respectively.

In summary, the tests described above, and as compared to the comparative data, confirm that the printing method of delivering the performance enhancing additives to conventional air filtration media did not impair the ability of the filter to remove particulate matter from the airstream (and may improve it), did not create a restriction to airflow or increase back pressure, and did provide a viable and efficient carrier for antimicrobial and/or odor reducing additives for conventional air filtration media.

What is claimed is:

1. An air filter comprising a filtration material having at least one surface, an enclosed frame surrounding said filtration material but exposing said one surface, said filtration material having intermittent geometric shapes of a latex base on said one surface intermittently dispersed over the entire said one surface, said latex base includes a latex binder and an enhanced additive incorporated into said latex binder.

2. The air filter of claim 1, wherein said enhanced additive is at least one antimicrobial additive.

3. The air filter of claim 1, wherein said enhanced additive is at least one odor control additive.

4. The air filter of claim 1, wherein said enhanced additive is at least one antimicrobial additive and at least one odor control additive.

5. The air filter of claim 2, wherein said antimicrobial additive is zinc pyrithione.

6. The air filter of claim 3, wherein said odor control additive is selected from the group consisting of carbon, natural or synthetic zeolites, molecular sieves, silica gel, and baking soda.

7. The air filter of claim 1, wherein the intermittent geometric shape is a circular dot having a diameter between about 0.1 mm to about 2 mm.

8. The air filter of claim 1, wherein the intermittent geometric shape is generally square.

9. An air filter comprising a filtration material having a first side and a second side, said filtration material is folded in accordion fashion to form a plurality of v-shaped pleats and housed within a paper-board frame, said filtration material having a plurality of latex base deposits on at least said first side or said second side of the filtration material intermittently dispersed over the entire said first side or said second side, said latex base includes a latex binder, at least one antimicrobial additive incorporated into said latex binder, and at least one odor control additive incorporated into said latex binder, and the air filter has a pressure drop of between about 0.15" to about 0.40" with an air flow rate of between about 600 cfm to about 900 cfm.

10. The air filter of claim 9, wherein said antimicrobial additive is zinc pyrithione.

11. The air filter of claim 9, wherein said odor control additive is selected from the group consisting of carbon, natural or synthetic zeolites, molecular sieves, silica gel, and baking soda.

12. The air filter of claim 9, wherein the latex base deposit is in the shape of a circular dot and the air filter contains a plurality of circular dots between about 30 per square inch to about 70 per square inch along said first side or said second side of the filtration media.

13. An air filter comprising a filtration material having at least one surface folded in accordion fashion to form a plurality of v-shaped pleats, an enclosed frame surrounding said filtration material but exposing said surface, said filtration material having circular dots of a latex base on said surface, wherein said circular dots of said latex base are dispersed along the entire said surface of said filtration material and cured on said surface of said filtration material, said latex base comprising a latex binder, an enhanced additive, and optionally a pigment.

14. The air filter of claim 13, wherein said enhanced additive contains at least one antimicrobial additive.

15. The air filter of claim 13, wherein said enhanced additive contains at least one odor control additive.

16. The air filter of claim 13, wherein said enhanced additive contains at least one antimicrobial additive and at least one odor control additive.

17. The air filter of claim 13, wherein said circular dots of said latex base have a diameter between about 0.1 mm to about 2 mm and spaced an equal distance apart on said surface.

* * * * *